United States Patent
Sukhadia et al.

(10) Patent No.: US 10,858,464 B2
(45) Date of Patent: *Dec. 8, 2020

(54) MEDIUM DENSITY POLYETHYLENE COMPOSITIONS

(71) Applicant: Chevron Phillips Chemical Company LP, The Woodlands, TX (US)

(72) Inventors: Ashish M. Sukhadia, Bartlesville, OK (US); Guylaine St. Jean, Bartlesville, OK (US); Qing Yang, Bartlesville, OK (US); Max P. McDaniel, Bartlesville, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 162 days.

This patent is subject to a terminal disclaimer.

(21) Appl. No.: 15/805,982

(22) Filed: Nov. 7, 2017

(65) Prior Publication Data

US 2018/0057618 A1 Mar. 1, 2018

Related U.S. Application Data

(63) Continuation of application No. 13/794,052, filed on Mar. 11, 2013, now Pat. No. 9,840,570.

(51) Int. Cl.
| | | |
|---|---|---|
| C08F 210/16 | (2006.01) | |
| C08F 210/02 | (2006.01) | |
| C08F 10/02 | (2006.01) | |
| C08F 10/08 | (2006.01) | |
| C08F 10/14 | (2006.01) | |
| C08J 5/18 | (2006.01) | |
| C08L 23/08 | (2006.01) | |
| C08F 210/18 | (2006.01) | |
| C08F 10/04 | (2006.01) | |
| C08F 10/06 | (2006.01) | |
| C08F 10/10 | (2006.01) | |

(52) U.S. Cl.
CPC ............ C08F 210/16 (2013.01); C08F 10/02 (2013.01); C08F 10/08 (2013.01); C08F 10/14 (2013.01); C08F 210/02 (2013.01); C08F 210/18 (2013.01); C08J 5/18 (2013.01); C08L 23/0807 (2013.01); C08L 23/0815 (2013.01); C08F 10/04 (2013.01); C08F 10/06 (2013.01); C08F 10/10 (2013.01); C08J 2323/08 (2013.01); C08L 2203/16 (2013.01); C08L 2205/025 (2013.01)

(58) Field of Classification Search
CPC .... C08F 210/02; C08F 210/16; C08F 210/18; C08F 10/02; C08L 23/0807; C08L 23/0815; C08J 2323/08; C08J 2323/16
See application file for complete search history.

(56) References Cited

U.S. PATENT DOCUMENTS

| | | |
|---|---|---|
| 3,248,179 A | 4/1966 | Norwood |
| 4,461,873 A | 7/1984 | Bailey et al. |
| 4,501,885 A | 2/1985 | Sherk et al. |
| 4,588,790 A | 5/1986 | Jenkins, III et al. |
| 4,966,951 A | 10/1990 | Benham et al. |
| 5,352,749 A | 10/1994 | DeChellis et al. |
| 5,436,304 A | 7/1995 | Griffin et al. |
| 5,455,314 A | 10/1995 | Burns et al. |
| 5,565,175 A | 10/1996 | Hottovy et al. |
| 5,575,979 A | 11/1996 | Hanson |
| 5,847,053 A | 12/1998 | Chum |
| 6,239,235 B1 | 5/2001 | Hottovy et al. |
| 6,262,191 B1 | 7/2001 | Hottovy et al. |
| 6,291,601 B1 | 9/2001 | Debras |
| 6,346,576 B1 | 2/2002 | Takahashi |
| 6,451,916 B1 | 9/2002 | Anderson et al. |
| 6,770,715 B2 | 8/2004 | Garrison et al. |
| 6,833,415 B2 | 12/2004 | Kendrick et al. |
| 7,226,886 B2 | 6/2007 | Jayaratne et al. |
| 7,312,283 B2 | 12/2007 | Martin et al. |
| 7,632,907 B2 | 12/2009 | Sukhadia et al. |
| 7,897,710 B2 | 3/2011 | Amos et al. |
| 9,840,570 B2* | 12/2017 | Sukhadia ................ C08F 10/02 |
| 2006/0155082 A1* | 7/2006 | McDaniel ............... C08F 10/00 526/114 |
| 2007/0007680 A1 | 1/2007 | Henri Barre et al. |
| 2007/0088129 A1 | 4/2007 | Jacobsen et al. |

(Continued)

FOREIGN PATENT DOCUMENTS

| | | |
|---|---|---|
| WO | 2007130277 A1 | 11/2007 |
| WO | 2014164260 A1 | 10/2014 |

OTHER PUBLICATIONS

Bird, R. Byron, et al., "Fluid Mechanics," Dynamics of Polymeric Liquids, vol. 1, Second Edition, 1987, cover page, publishing page, pp. xiii-xviii, and 171-172, John Wiley & Sons, Inc.

(Continued)

*Primary Examiner* — Ling Siu Choi
*Assistant Examiner* — David L Miller
(74) *Attorney, Agent, or Firm* — Conley Rose, P.C.

(57) ABSTRACT

An ethylene alpha-olefin copolymer having (a) a density of from about 0.910 g/cc to about 0.940 g/cc; (b) a weight average molecular weight of from about 150,000 g/mol to about 300,000 g/mol; and (c) a melt index at a load of 2.16 kg of from about 0.01 dg/10 min. to about 0.5 dg/min.; wherein a 1 mil blown film formed from the polymer composition is characterized by (i) a Dart Impact strength greater than about 175 g/mil; (ii) an Elmendorf machine direction tear strength greater than about 20 g/mil; and (iii) an Elmendorf transverse direction tear strength greater than about 475 g/mil.

18 Claims, No Drawings

(56) References Cited

U.S. PATENT DOCUMENTS

2010/0203311 A1    8/2010   Michie, Jr.
2011/0028665 A1    2/2011   Eriksson et al.
2012/0015123 A1    1/2012   Kwon et al.

OTHER PUBLICATIONS

Hieber, C. A., et al., "Shear-Rate-Dependence Modeling of Polymer Melt Viscosity," Jul. 1992, pp. 931-938, vol. 32, No. 14, Polymer Engineering and Science.
Hieber, C. A., et al., "Some correlations involving the shear viscosity of polystyrene melts," 1989, pp. 321-332, vol. 28, No. 4, Rheologica Acta.
Sukhadia, A., "Trade-Offs in Blown Film LLDPE Type Resins from Chromium, Metallocene and Zieglier-Natta Catalysts," Jan. 2000, vol. 16, pp. 54-70, Journal of Plastic Film & Sheeting;Technnomic Publishing Co., Ltd.
"Propagation Tear Resistance of Plastic Film and Thin Sheeting by Pendulum Method (Elmendorf Tear) ASTM 01922," Pack to Polymers & Plastics (/polymers-plastics/), Accessed Mar. 17, 2016, 4 pages, http://www.intertek.com/polymers/estlopedia/elmendorf-tear-astm-d 1922/.
Foreign communication from a corresponding application—International Search Report and Written Opinion, PCT/US2014/021549, dated May 20, 2014, 8 pgs.

\* cited by examiner

MEDIUM DENSITY POLYETHYLENE COMPOSITIONS

CROSS-REFERENCE TO RELATED APPLICATIONS

This application is a continuation of and claims priority to U.S. patent application Ser. No. 13/794,052 filed Mar. 11, 2013, published as U.S. Patent Application Publication No. US 2014/0256901 A1, entitled "Novel Medium Density Polyethylene Compositions," which is hereby incorporated by reference in its entirety for all purposes.

FIELD

The present disclosure relates to novel polymer compositions and film made from same, more specifically to polyethylene compositions for the manufacture of medium density films.

BACKGROUND

Polyolefins are plastic materials useful for making a wide variety of valued products due to their combination of stiffness, ductility, barrier properties, temperature resistance, optical properties, availability, and low cost. In particular, polyethylene (PE) is one of the largest volume polymers consumed in the world. It is a versatile polymer that offers high performance relative to other polymers and alternative materials such as glass, metal or paper. One of the most valued products is plastic films. Plastic films such as PE films are mostly used in packaging applications but they also find utility in the agricultural, medical and engineering fields.

PE films are manufactured in a variety of polymer grades that are usually differentiated by the polymer density such that PE films can be designated for example, low density polyethylene (LDPE), medium density polyethylene (MDPE) and, high density polyethylene (HDPE) wherein each density range has a unique combination of properties making it suitable for a particular application. Generally speaking, MDPE films provide a balance between resiliency and flexibility. An ongoing need exists for polymer compositions having the desired density and balance of properties.

SUMMARY

Disclosed herein is an ethylene alpha-olefin copolymer having (a) a density of from about 0.910 g/cc to about 0.940 g/cc; (b) a weight average molecular weight of from about 150,000 g/mol to about 300,000 g/mol; and (c) a melt index at a load of 2.16 kg of from about 0.01 dg/min. to about 0.5 dg/min.; wherein a 1 mil blown film formed from the polymer composition is characterized by (i) a Dart Impact strength greater than about 175 g/mil; (ii) an Elmendorf machine direction tear strength greater than about 20 g/mil; and (iii) an Elmendorf transverse direction tear strength greater than about 475 g/mil.

Also disclosed herein is an ethylene alpha-olefin copolymer having (a) a density of from about 0.910 g/cc to about 0.940; (b) a weight average molecular weight of from about 150,000 g/mol to about 300,000 g/mol; and (c) a melt index at a load of 2.16 kg of from about 0.01 dg/10 min. to about 0.5 dg/min.; wherein a 1 mil blown film formed from the polymer composition has (i) a Dart Impact strength greater than about 200 g/mil; (ii) an Elmendorf machine direction tear strength less than about 100 g/mil; and (iii) an Elmendorf transverse direction tear strength greater than about 550 g/mil.

Also disclosed herein is an ethylene alpha-olefin copolymer having a density of from about 0.910 g/cc to about 0.940 g/cc; a weight average molecular weight of from about 150,000 g/mol to about 300,000 g/mol; a melt index at a load of 2.16 kg of from about 0.01 dg/min. to about 0.5 dg/min.; a melt index at a load of 5.0 kg of from about 0.01 dg/min. to about 1 dg/min.; a melt index at a load of 10.0 kg of from about 0.01 dg/min. to about 5 dg/min; a high-load melt index at a load of 21.6 kg of from about 4 dg/min to about 25 dg/min wherein a 1-mil blown film formed from the polymer composition has an Elmendorf tear strength in the machine direction of from about 10 g to about 130 g as determined in accordance with ASTM D1922.

DETAILED DESCRIPTION

Disclosed herein are polyethylene (PE) polymers, PE films, and methods of making same. Such methods may comprise preparing a PE polymer and forming the polymer into a film. In an aspect, the PE polymer comprises a multimodal PE resin and the film prepared therefrom may display enhanced mechanical properties such as increased toughness and tear properties.

The PE polymer of the present disclosure can be formed using any suitable olefin polymerization method which may be carried out using various types of polymerization reactors. As used herein, "polymerization reactor" includes any polymerization reactor capable of polymerizing olefin monomers to produce homopolymers or copolymers. Such homopolymers and copolymers are referred to as resins or polymers.

The various types of reactors include those that may be referred to as batch, slurry, gas-phase, solution, high pressure, tubular, or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted co-monomer, and/or diluent.

Polymerization reactor systems of the present disclosure may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors, or a combination of high pressure with loop and/or gas reactors. The multiple reactors may be operated in series or in parallel.

According to one aspect of the disclosure, the polymerization reactor system may comprise at least one loop slurry reactor comprising vertical and/or horizontal loops. Monomer, diluent, catalyst and optionally any co-monomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or co-monomer. Various technologies may be used for this separation step including but not limited to, flashing that may include any combination of heat addition and pressure reduction; separation by cyclonic action in either a cyclone or hydrocyclone; or separation by centrifugation.

A suitable slurry polymerization process (also known as the particle form process), is disclosed, for example, in U.S. Pat. Nos. 3,248,179, 4,501,885, 5,565,175, 5,575,979, 6,239,235, 6,262,191, and 6,833,415, each of which is incorporated by reference herein in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference herein in its entirety.

According to still another aspect of the disclosure, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure, and the concentrations of various reactants. Polymerization temperature can affect catalyst productivity, polymer molecular weight and molecular weight distribution. Suitable polymerization temperature may be any temperature below the de-polymerization temperature according to the Gibbs free energy equation. Typically, this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200 to about 500 psig. High pressure polymerization in tubular or autoclave reactors is generally run at about 20,000 to about 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching and rheological measurements.

The concentrations of monomer, hydrogen, modifiers, and electron donors may be utilized in producing these resin properties. Co-monomer is used to control product density. Hydrogen can be used to control product molecular weight. Modifiers can be used to control product properties and electron donors affect stereoregularity. In addition, the concentration of poisons is minimized because poisons impact the reactions and product properties. In an embodiment, hydrogen is added to the reactor during polymerization. Alternatively, hydrogen is not added to the reactor during polymerization.

The polymer or resin may be formed into various articles, including, but not limited to pipes, bottles, toys, containers, utensils, film products, drums, tanks, membranes, and liners. Various processes may be used to form these articles, including, but not limited to, film blowing and cast film, blow molding, extrusion molding, rotational molding, injection molding, fiber spinning, thermoforming, cast molding, and the like. After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

The PE polymer may include other suitable additives. Examples of additives include, but are not limited to, antistatic agents, colorants, stabilizers, nucleators, surface modifiers, pigments, slip agents, antiblocks, tackafiers, polymer processing aids and combinations thereof. In an embodiment, the PE polymer comprises carbon black. Such additives may be used singularly or in combination and may be included in the polymer composition before, during or after preparation of the PE polymer as described herein. In an embodiment, the compositions disclosed herein comprise less than about 1 weight percent of nonpolymeric additives. Such additives may be added via known techniques, for example during an extrusion or compounding step such as during pelletization or subsequent processing into an end use article. Herein the disclosure will refer to a PE polymer although a polymer composition comprising the PE polymer and one or more additives is also contemplated.

The concentrations of monomer, co-monomer, hydrogen, co-catalyst, modifiers, and electron donors are important in producing these resin properties. Comonomer may be used to control product density. Hydrogen can be used to control product molecular weight. Co-catalysts can be used to alkylate, scavenge poisons and control molecular weight. Modifiers can be used to control product properties and electron donors affect stereoregularity. In addition, the concentration of poisons is minimized because poisons impact the reactions and product properties.

Any catalyst composition capable of producing a PE polymer of the type disclosed herein may be employed in the production of the polymer. Typical catalyst compositions that can be employed include supported chromium catalysts, Ziegler-Natta catalysts, metallocene catalysts, or combinations thereof. For example, a catalyst composition for the production of a PE polymer may include at least two metallocenes that are selected such that the polymers produced therefrom have two distinctly different molecular weights. The first metallocene may be used to produce the HMW component, and may be a tightly-bridged metallocene containing a substituent that includes a terminal olefin. The second metallocene, that may be used to produce the LMW component, is generally not bridged and is more responsive to chain termination reagents, such as hydrogen, than the first metallocene. The metallocenes may be combined with an activator, an aluminum alkyl compound, an olefin monomer, and an olefin comonomer to produce the desired polyolefin. The activity and the productivity of the catalyst may be relatively high. As used herein, the activity refers to the grams of polymer produced per gram of solid catalyst charged per hour, and the productivity refers to the grams of polymer produced per gram of solid catalyst charged. Such catalysts are disclosed for example in U.S. Pat. Nos. 7,312,283 and 7,226,886 each of which is incorporated herein by reference in its entirety.

In an embodiment, a catalyst composition comprises a first metallocene compound, a second metallocene compound, an activator and optionally an organoaluminum compound. The first metallocene compound may be characterized by the general formula:

$(X^1R^1)(X^2R^2{}_2)(X^3)(X^4)M^1;$ wherein $(X^1)$ is cyclopentadienyl, indenyl, or fluorenyl, $(X^2)$ is fluorenyl, and $(X^1)$ and $(X^2)$ are connected by a disubstituted bridging group comprising one atom bonded to both $(X^1)$ and $(X^2)$, wherein the atom is carbon or silicon. A first substituent of the disubstituted bridging group is an aromatic or aliphatic group having from 1 to about 20 carbon atoms. A second substituent of the disubstituted bridging group can be an aromatic or aliphatic group having from 1 to about 20 carbon atoms, or the second substituent of the disubstituted bridging group is an unsaturated aliphatic group having from 3 to about 10 carbon atoms. $R^1$ is H, or an unsaturated aliphatic group having from 3 to about 10 carbon atoms. $R^2$ is H, an alkyl group having from 1 to about 12 carbon atoms, or an aryl group; $(X^3)$ and $(X^4)$ are independently an aliphatic group, an aromatic group, a cyclic group, a combination of aliphatic and cyclic groups, or a substituted derivative thereof, having from 1 to about 20 carbon atoms, or a halide; and $M^1$ is Zr or Hf. The first substituent of the disubstituted bridging group may be a phenyl group. The second substituent of the disubstituted bridging group may be a phenyl group, an alkyl group, a butenyl group, a pentenyl group, or a hexenyl group.

The second metallocene compound may be characterized by the general formula:

$(X^5)(X^6)(X^7)(X^8)M^2;$ wherein $(X^5)$ and $(X^6)$ are independently a cyclopentadienyl, indenyl, substituted cyclopentadienyl or a substituted indenyl, each substituent on $(X^5)$ and $(X^6)$ is independently selected from a linear or branched alkyl group, or a linear or branched alkenyl group, wherein the alkyl group or alkenyl group is unsubstituted or substituted, any substituent on $(X^5)$ and $(X^6)$ having from 1 to about 20 carbon atoms; $(X^7)$ and $(X^8)$ are independently an aliphatic group, an aromatic group, a cyclic group, a combination of aliphatic and cyclic groups, or a substituted derivative thereof, having from 1 to about 20 carbon atoms; or a halide, and $M^2$ is Zr or Hf.

In an embodiment of the present disclosure, the ratio of the first metallocene compound to the second metallocene compound may be from about 1:10 to about 10:1. According to other aspects of the present disclosure, the ratio of the first metallocene compound to the second metallocene compound may be from about 1:5 to about 5:1. According to yet other aspects of the present disclosure, the ratio of the first metallocene compound to the second metallocene compound may be from about 1:2 to about 2:1.

In an embodiment of the present disclosure, the activator may be a solid oxide activator-support, a chemically treated solid oxide, a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, an aluminoxane, a supported aluminoxane, an ionizing ionic compound, an organoboron compound, or any combination thereof. The terms "chemically-treated solid oxide", "solid oxide activator-support", "acidic activator-support", "activator-support", "treated solid oxide compound", and the like are used herein to indicate a solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide compound comprises the calcined contact product of at least one solid oxide compound with at least one electron-withdrawing anion source compound. Typically, the chemically-treated solid oxide comprises at least one ionizing, acidic solid oxide compound. The terms "support" and "activator-support" are not used to imply these components are inert, and such components should not be construed as an inert component of the catalyst composition.

The organoaluminum compound used with the present disclosure may have the formula:

$(R^3)_3Al;$ in which ($R^3$) is an aliphatic group having from 2 to about 6 carbon atoms. In some instances, ($R^3$) is ethyl, propyl, butyl, hexyl, or isobutyl.

In an embodiment, the catalysts are chosen from compounds like those represented by the chemical structures A and B with sulfated alumina as the activator-support and with tri-isobutylaluminum (TIBA) as the co-catalyst.

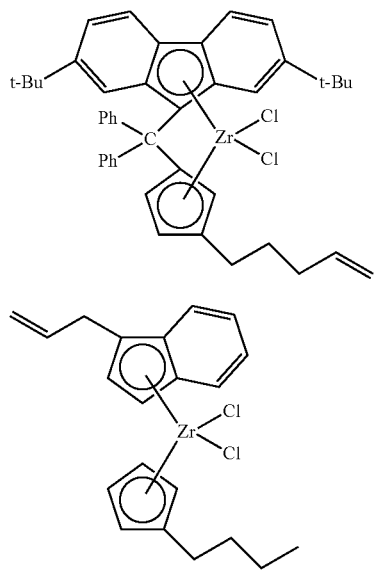

The PE polymer and/or individual components of the PE polymer may comprise a homopolymer, a copolymer, or blends thereof. In an embodiment, the PE polymer is a polymer of ethylene with one or more comonomers such as alpha olefins. In an embodiment, the PE polymer comprises a higher molecular weight ethylene/1-olefin copolymer (HMW) component and a lower molecular weight ethylene/1-olefin copolymer (LMW) component. The comonomer of the HMW component of the PE polymer may be the same as or different from the comonomer of the LMW component. Examples of suitable comonomers include without limitation unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof. In an embodiment, the comonomer for the LMW component and HMW component of the PE polymer is 1-hexene. In an embodiment, the comonomer (e.g., 1-hexene) is present in an amount of greater than about 0.5 wt % to about 14 wt %, alternately from about 1 wt % to about 12 wt %, or alternately from about 2.5 wt % to about 8.5 wt % based on NMR analysis.

The PE polymer may be a unimodal resin, alternatively a multimodal resin. Herein, the "modality" of a polymer resin refers to the form of its molecular weight distribution curve, i.e. the appearance of a graph of the polymer weight fraction, frequency, or number as a function of its molecular weight. The polymer weight fraction refers to the weight fraction of molecules of a given size. A polymer resin may have two or more components that may be distinguishable from one another, for example based upon their individual composition and/or molecular weight distribution. A molecular weight distribution curve may be prepared for each individual component of the polymer resin.

The molecular weight distribution curves for the individual components may be superimposed onto a common chart to form the weight distribution curve for the polymer resin as a whole. Upon such superimposition, the resultant curve for the polymer resin as a whole may be multimodal or show n distinct peaks corresponding to n polymer components of differing molecular weight distributions. For example, a polymer having a molecular weight distribution curve showing a single peak may be referred to as a unimodal polymer, a polymer having a curve showing two distinct peaks may be referred to as a bimodal polymer, a polymer having a curve showing three distinct peaks may be referred to as a trimodal polymer, etc. Polymers having molecular weight distribution curves showing more than one peak may be collectively referred to as multimodal polymers or resins. Furthermore, the distinct peaks may correspond to components exhibiting distinct characteristics. For example, a bimodal polymer resin may show two distinct peaks corresponding to two individual components of differing molecular weights.

In an embodiment, the PE polymer comprises a bimodal PE polymer. In such embodiments, the LMW component may be present in an amount ranging from about 25% to about 95%, alternatively from about 40% to about 80% or alternatively from about 50% to about 75% while the HMW component may be present in an amount of from about 5% to about 75%, alternatively from about 20% to about 60% or alternatively from about 25% to about 50% with the percentages being based on the total weight of the PE polymer. The remainder of the discussion will focus on bimodal PE polymers with the understanding that other polymers, for example having different modality, may be employed in various aspects and embodiments as would be apparent to one skilled in the art with the benefits of this disclosure.

The PE polymers disclosed herein may have a variety of properties and parameters described below either singularly or in combination. Any suitable methodology may be employed for determination of these properties and parameters.

In an embodiment, the LMW component of the PE polymer may have a weight average molecular weight ($M_w$) ranging from about 5,000 g/mol to about 100,000 g/mol, alternatively from about 10,000 g/mol to about 80,000 g/mol or alternatively from about 15,000 g/mol to about 60,000 g/mol while the HMW component of the PE polymer may have a $M_w$ ranging from about 300,000 g/mol to about 600,000 g/mol, alternatively from about 325,000 g/mol to about 550,000 g/mol or alternatively from about 350,000 g/mol to about 520,000 g/mol. The PE polymer as a whole may have a $M_w$ of from about 150,000 g/mol to about 300,000 g/mol, alternatively, from about 170,000 g/mol to about 280,000 g/mol, or alternatively, from about 190,000 g/mol to about 265,000 g/mol. The $M_w$ may be calculated according to equation 1:

$$\overline{M}_w = \frac{\sum_i N_i M_i^2}{\sum_i N_i M_i} \qquad (1)$$

where $N_i$ is the number of molecules of molecular weight $M_i$. All molecular weight averages are expressed in gram per mole (g/mol).

In an embodiment, the PE polymer may have a number average molecular weight ($M_n$) ranging from about 8,000 g/mol to about 35,000 g/mol, alternatively from about 9,000 g/mol to about 30,000 g/mol or alternatively from about 10,000 g/mol to about 25,000 g/mol. The $M_n$ is the common average of the molecular weights of the individual polymers calculated as shown in Equation 2 by measuring the molecular weight of n polymer molecules, summing the weights, and dividing by n.

$$\overline{M}_n = \frac{\sum_i N_i M_i}{\sum_i N_i} \quad (2)$$

The molecular weight distribution (MWD) of the PE polymer may be characterized by determining the ratio of the $M_w$ to the $M_n$, which is also referred to as the polydispersity index (PDI) or more simply as polydispersity. The PE polymers of this disclosure as a whole may display a PDI of from about 4 to about 50, alternatively from about 5 to about 40, or alternatively from about 6 to about 35.

The PE polymers of this disclosure may have a melt index (MI) under a force of 2.16 kg of from about 0.01 dg/min to about 0.5 dg/min, alternatively from about 0.1 dg/min to about 0.5 dg/min, alternatively from about 0.01 dg/min to about 0.3 dg/min, or alternatively from about 0.01 dg/min to about 0.25 dg/min.

The PE polymers of this disclosure may have a melt index under a force of 5 kg (I5) of from about 0.01 dg/min to about 1 dg/min, alternatively from about 0.01 dg/min to about 0.08 dg/min, or alternatively from about 0.01 dg/min to about 0.07 dg/min.

The PE polymers of this disclosure may have a melt index under a force of 10 kg (I10) of from about 0.1 dg/min to about 5 dg/min, alternatively from about 0.1 dg/min to about 3 dg/min, or alternatively from about 0.1 dg/min to about 2.0 dg/min. The melt index (MI (I2.16), I5, I10) represents the rate of flow of a molten resin through an orifice of 0.0825 inch diameter when subjected to the indicated force at 190° C. as determined in accordance with ASTM D1238.

The PE polymers of this disclosure may have a high load melt index (HLMI) of from about 4 dg/min to about 25 dg/min, alternatively from about 5 dg/min to about 20 dg/min, or alternatively from about 6 dg/min to about 16 dg/min. The HLMI represents the rate of flow of a molten resin through an orifice of 0.0825 inch diameter when subjected to a force of 21.6 kg at 190° C. as determined in accordance with ASTM D1238.

The PE polymers of this disclosure may be further characterized as having a density of from about 0.910 g/cc to about 0.940 g/cc, alternatively from about 0.920 g/cc to about 0.940 g/cc or alternatively from about 0.925 g/cc to about 0.940 g/cc. The density refers to the mass per unit volume of polymer and may be determined in accordance with ASTM D1505.

The PE polymers of this disclosure may be further characterized by their rheological breadth. Rheological breadth refers to the breadth of the transition region between Newtonian and power-law type shear rate for a polymer or the frequency dependence of the viscosity of the polymer. The rheological breadth is a function of the relaxation time distribution of a polymer resin, which in turn is a function of the resin molecular structure or architecture. Assuming the Cox-Merz rule, the rheological breadth may be calculated by fitting flow curves generated in linear-viscoelastic dynamic oscillatory frequency sweep experiments with a modified Carreau-Yasuda (CY) model, which is represented by equation 3:

$$E = E_o[1 + (T_\xi \dot{\gamma})^a]^{\frac{n-1}{a}} \quad (3)$$

where
E=viscosity (Pa·s)
$\dot{\gamma}$=shear rate (1/s)
a=rheological breadth parameter
$T_\xi$=relaxation time (s) [describes the location in time of the transition region]
$E_o$=zero shear viscosity (Pa·s) [defines the Newtonian plateau]
n=power law constant [defines the final slope of the high shear rate region].

To facilitate model fitting, the power law constant is held at a constant value. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987), each of which is incorporated by reference herein in its entirety.

In an embodiment, the PE polymer of this disclosure has an "eta zero" ($E_0$) value of from about $1 \times 10^4$ Pa·s to about $5 \times 10^5$ Pa·s, alternatively from about $4 \times 10^4$ Pa·s to about $3 \times 10^5$ Pa·s, or alternatively from about $6 \times 10^4$ Pa·s to about $2.5 \times 10^5$ Pa·s when the dynamic complex viscosity versus frequency scan are fitted to the Carreau-Yasuda equation with an n=0.1818 value.

In an embodiment, the PE polymer of this disclosure has an CY"a" value of from about 0.35 to about 0.65, alternatively from about 0.38 to about 0.63, or alternatively from about 0.40 to about 0.60 wherein the dynamic complex viscosity versus frequency scan are fitted to the Carreau-Yasuda equation with an n=0.1818 value.

In an embodiment, a PE polymer of this disclosure has an "tau eta" (T) value of from about 0.2 seconds (s) to about 5.0 s, alternatively from about 0.4 s to about 3.0 s, or alternatively from about 0.5 s to about 2.5 s wherein the dynamic complex viscosity versus frequency scan are fitted to the Carreau-Yasuda equation with an n=0.1818 value.

In an embodiment, a PE polymer of this disclosure is fabricated into a film. The films of this disclosure may be produced using any suitable methodology. In an embodiment, the polymeric compositions are formed into films through a blown film process. In a blown film process, plastic melt is extruded through an annular slit die, usually vertically, to form a thin walled tube. Air is introduced via a hole in the center of the die to blow up the tube like a balloon. Mounted on top of the die, a high-speed air ring blows onto the hot film to cool it. The tube of film then continues upwards, continually cooling, until it passes through nip rolls where the tube is flattened to create what is known as a lay-flat tube of film. This lay-flat or collapsed tube is then taken back down the extrusion tower via more rollers. On higher output lines, the air inside the bubble is also exchanged. This is known as Internal Bubble Cooling (IBC).

The lay-flat film is then either kept as such or the edges of the lay-flat are slit off to produce two flat film sheets and wound up onto reels. Typically, the expansion ratio between die and blown tube of film would be 1.5 to 4 times the die diameter. The films are extruded using "HDPE film" or "high-stalk extrusion" conditions with a neck height (freeze line height) to die diameter ratio from about 6:1 to 10:1. The drawdown between the melt wall thickness and the cooled film thickness occurs in both radial and longitudinal directions and is easily controlled by changing the volume of air inside the bubble and by altering the haul off speed. The films formed from PE polymers of this disclosure may be of any thickness desired by the user. Alternatively, the PE polymers of this disclosure may be formed into films having a thickness of from about 0.1 mils to about 8 mils, alternatively from about 0.2 mils to about 5 mils, or alternatively from about 0.3 mils to about 3 mils.

Films formed from PE polymers of this disclosure may be characterized by a 1% secant modulus in the transverse direction (TD) of from about 300 MPa to about 1200 MPa, alternatively from about 350 MPa to about 1100 MPa, or alternatively from about 400 MPa to about 1050 MPa as determined in accordance with ASTM D882.

In an embodiment, the films formed from PE polymers of this disclosure may be characterized by a 1% secant modulus in the machine direction (MD) of from about 350 MPa to about 800 MPa, alternatively from about 350 MPa to about 750 MPa, or alternatively from about 400 MPa to about 700 MPa as determined in accordance with ASTM D882, using a test specimen having a 1.0 mil thickness. The secant modulus is a measure of the rigidity or stiffness of a material. It is basically the applied tensile stress, based on the force and cross-sectional area, divided by the observed strain at that stress level. It is generally constant before the material approaches the point at which permanent deformation will begin to occur.

In an embodiment, the films formed from PE polymers of this disclosure may display enhanced toughness and tear properties. In an embodiment, the films formed from PE polymers of this disclosure may display an increased impact strength as indicated by an increased dart drop strength. The dart drop strength refers to the weight required to cause 50% of tested films to fail by impact from a falling dart under specified test conditions. Specifically, one method employs the use of a dart having a 38 mm (1.5 in) head diameter dropped from a height of 0.66 m (26. in). In an aspect, films formed from PE polymers of this disclosure have a dart drop strength, also termed a dart impact strength, of greater than about 175 g, alternatively greater than about 200 g as measured in accordance with ASTM D1709 Method A using a test specimen having a 1 mil thickness. In an alternative embodiment, the films formed from the PE polymers of this disclosure have a dart drop strength ranging from about 100 g to about 900 g, alternatively from about 150 g to about 850 g or alternatively from about 200 g to about 800 g as measured in accordance with ASTM D1709 Method A using a test specimen having a 1 mil thickness.

In an embodiment, the films formed from PE polymers of this disclosure may display increased tear strength as indicated by an increased Elmendorf tear strength. The Elmendorf tear strength refers to the average force required to propagate tearing through a specified length of plastic film or nonrigid sheeting on an Elmendorf-type tear tester. Specifically, test specimens having a pre-cut slit are contacted with a knife-tipped pendulum. The average force required to propagate tearing is calculated from the pendulum energy lost while tearing the test specimen. The tear may be propagated either in the MD or TD. In an embodiment, films formed from PE polymers of this disclosure have an Elmendorf tear strength in the MD of greater than about 20 g, alternatively greater than about 100 g. In an embodiment, films formed from PE polymers of this disclosure have an Elmendorf tear strength in the TD of greater than about 475 g, alternatively greater than about 550 g. In an alternative embodiment, the films formed from the PE polymers of this disclosure have an Elmendorf tear strength in the MD of from about 10 g to about 130 g, alternatively from about 10 g to about 110 g, or alternatively from about 15 g to about 100 g and an Elmendorf tear strength in the TD ranging from about 300 g to about 1000 g, alternatively from about 350 g to about 900 g, or alternatively from about 400 g to about 850 g as measured in accordance with ASTM D1922 using a test specimen having a 1.0 mil thickness.

In an embodiment, the films formed from PE polymers of this disclosure may display an increased impact strength as indicated by an increased Spencer impact. Spencer impact measures the energy necessary to burst and penetrate the center of a specimen, mounted between two rings with a 3.5 inch diameter. The following equation, equation 4, may be used to obtain an impact value in joules:

$$E=RC/100 \qquad (4)$$

where E is the energy to rupture, Joules, C is the apparatus capacity and, R is the scale reading on a 0 to 100 scale. In an embodiment, the films formed from the PE polymers of this disclosure have a Spencer impact of from about 0.25 J to about 2.5 J, alternatively from about 0.3 J to about 2.3 J, or alternatively from about 0.5 J to about 2 J as measured in accordance with ASTM D3420 using a test specimen having a 1 mil thickness.

In an embodiment, films formed from the PE polymers of this disclosure are characterized by a TD yield strength ranging from about 1400 psi to about 5800 psi, alternatively from about 1700 psi to about 5000 psi, or alternatively from about 2000 psi to about 4500 psi. In an embodiment, films formed from the PE polymers of this disclosure are characterized by a TD yield strain ranging from about 2% to about 15%, alternatively from about 3% to about 13%, or alternatively from about 3.5% to about 12%. In an embodiment, films formed from the PE polymers of this disclosure are characterized by a TD break strength ranging from about 4300 psi to about 10000 psi alternatively from about 5000 psi to about 9000 psi, or alternatively from about 5500 psi to about 8500 psi.

In an embodiment, films formed from the PE polymers of this disclosure are characterized by a break strength in the MD ranging from about 6500 psi to about 13500 psi, alternatively from about 7000 psi to about 13000 psi, or alternatively from about 8000 psi to about 12500 psi. In an embodiment, films formed from the PE polymers of this disclosure are characterized by a MD yield strain of less than about 8%, alternatively from about 2% to about 7.5%, or alternatively from about 4% to about 7.0%. The yield strength refers to the stress a material can withstand without permanent deformation of the material while the yield strain refers to amount of deformation elongation that occurs without permanent deformation of the material. The break strength refers to the tensile stress corresponding to the point of rupture while the MD break strain refers to the tensile elongation in the machine direction corresponding to the point of rupture. The yield strength, yield strain, break strength, break strain in the MD may be determined in accordance with ASTM D882. In an embodiment, the sum of the MD yield strain and TD yield strain is less than about 15%, alternatively less than about 14.5%, or alternatively less than about 14%.

In an embodiment, films formed from the PE polymers of this disclosure are characterized by a haze of greater than about 60%, alternatively greater than about 70%, alternatively greater than about 80%, or alternatively greater than about 90%. Haze is the cloudy appearance of a material caused by light scattered from within the material or from its surface. The haze of a material can be determined in accordance with ASTM D1003.

In an embodiment, the films formed from PE polymers of this disclosure may display characteristic oxygen transmission rates (OTR) and/or moisture vapor transmission rates (MVTR). OTR is the measurement of the amount of oxygen gas that passes through a film over a given period. Testing may be conducted under a range of relative humidity conditions at a range of temperatures. Typically, one side of the film is exposed to the oxygen permeant. As it solubilizes into the film and permeates through the sample material, nitrogen sweeps the opposite side of the film and transports the transmitted oxygen molecules to a coulometric sensor. This value is reported as a transmission rate. When this rate is multiplied by the average thickness of the material, the results are considered a permeability rate. In an embodiment, the films formed from the PE polymers of this disclosure have an OTR of less than about 525 cc/100 in$^2$ alternatively less than about 500 cc/100 in$^2$ alternatively from about less than about 475 cc/100 in$^2$ for a 1-mil film as measured in accordance with ASTM D3985.

The MVTR measures passage of gaseous H$_2$O through a barrier. The MVTR may also be referred to as the water vapor transmission rate (WVTR). Typically, the MVTR is measured in a special chamber, divided vertically by the substrate/barrier material. A dry atmosphere is in one chamber, and a moist atmosphere is in the other. A 24-hour test is run to see how much moisture passes through the substrate/barrier from the "wet" chamber to the "dry" chamber under conditions which can specify any one of five combinations of temperature and humidity in the "wet" chamber. In an embodiment, the films formed from the PE polymers of this disclosure have an MVTR of less than about 1.3 g-mil/100 in$^2$-day; alternatively less than about 1.1 g-mil/100 in$^2$-day or alternatively less than about 1 g-mil/100 in$^2$-day for 1-mil film as measured in accordance with ASTM F 1249 at 100° F. and 90% relative humidity (RH).

In an embodiment, the films produced by the compositions and methods of this disclosure display a unique combination of impact properties and tear strength at the disclosed densities. The films of this disclosure may be used in the formation of any variety of end-use articles such as for example merchandise bags, t-shirt bags, trash can liners, grocery sacks, produce bags, food packaging for contents such as cereals, crackers, cheese, meat, etc.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

Two experimental resins, designated Samples A and B, were prepared using differing dual metallocene catalysts under conditions of the type disclosed herein. The resin density, HLMI and MI are presented in Table 1. COMP-1 is a typical commercial unimodal resin of medium density.

TABLE 1

| Sample | Density (g/cc) | MI (dg/min.) | HLMI (dg/min.) |
|---|---|---|---|
| COMP-1 | 0.9374 | 0.26 | 22.1 |
| INV-A | 0.9377 | 0.09 | 10.4 |
| INV-B | 0.9409 | 0.12 | 27.2 |

The three resins from Table 1 were formed into blown films using a BGE blown film with internal bubble cooling and a 6-inch die, 0.040 inch die gap, at an output rate of 250 lb/hr, a 4:1 blow up ratio (BUR), a 42 inch freeze line (neck) height (7:1 freeze line height to die diameter ratio), a flat set extrusion temperature profile of 210° C. across the extruder and die and 1.0 mil gauge. The thickness of the film may also be referred to as the film gauge. The dart and tear properties of the blown film were evaluated and are presented in Table 2.

TABLE 2

| Sample | Dart Drop (g) | Spencer (J) | MD Tear (g) | TD Tear (g) |
|---|---|---|---|---|
| COMP-1 | 52 | 0.40 | 19 | 676 |
| INV-A | 226 | 1.26 | 30 | 944 |
| INV-B | 188 | 0.64 | 23 | 467 |

The tensile properties of the blown film were further investigated and that data is presented in Table 3.

TABLE 3

| Sample | MD Modulus psi | MD Break Strain % | MD Break Strength psi | MD Yield Strain % | MD Yield Strength psi | TD Modulus psi | TD Break Strain % | TD Break Strength psi | TD Yield Strain % | TD Yield Strength psi |
|---|---|---|---|---|---|---|---|---|---|---|
| COMP-1 | 80,597 | 472 | 9,063 | 17 | 2,977 | 106,083 | 739 | 7,055 | 11 | 3,371 |
| INV-A | 83,489 | 282 | 7,998 | 16 | 3,208 | 127,500 | 572 | 5,701 | 9 | 3,329 |
| INV-B | 68,579 | 306 | 4,830 | 13 | 2,701 | 91,422 | 527 | 3,433 | 8 | 2,501 |

The data indicated that compared to a conventional MDPE (i.e., Sample COMP-1), Samples INV-A and INV-B, which are PE polymers of the type disclosed herein (i.e., PITs), displayed impact properties that were nearly four times greater than that of a conventional MDPE resin. For both Samples INV-A and INV-B the MD tear strength of the films was higher than that of Sample COMP-1. For Sample INV-A, the TD tear strength was considerably greater than Sample COMP-1 while still exhibiting higher dart drop and MD tear strength.

Additional samples of PE resins of the type disclosed herein were prepared on a 1.5" Davis-Standard Blown Film line equipped with Sano die having 2 inch die diameter, a 0.035 inch die gap at a 4:1 BUR and a 14 inch freeze line (neck) height and a flat set extrusion temperature profile of 205° C. across the extruder and die, an output rate of 30 lb/hr and 1-mil gauge. The resin density, HLMI, and properties of the films are presented in Table 4. Sample COMP-1 was a typical commercial unimodal resin of medium density and was used as a control.

TABLE 4

| Sample | Pellet Density (g/cc) | HLMI, (dg/min) | Dart (g) | MD Tear (g) | TD Tear (g) |
|---|---|---|---|---|---|
| INV-E | 0.9273 | 17.8 | 259 | 88 | 672 |
| INV-G | 0.9352 | 9.5 | 261 | 88 | 553 |
| INV-H | 0.9386 | 15.0 | 200 | 86 | 589 |
| INV-I | 0.9364 | 10.1 | 314 | 82 | 532 |
| INV-J | 0.9410 | 9.5 | 219 | 79 | 763 |
| INV-K | 0.9366 | 5.4 | 494 | 47 | 768 |
| INV-L | 0.9382 | 9.2 | 248 | 54 | 799 |
| INV-M | 0.9382 | 8.6 | 246 | 33 | 801 |
| INV-N | 0.9371 | 5.8 | 415 | 46 | 648 |
| COMP-1 | 0.9385 | 23.1 | 71 | 62 | 543 |

Several of the samples listed in Table 4 were also formed into blown film having a thickness of 0.5 mils. Downgauging to thinner gauge did not impact bubble stability. The impact strength properties of the films at 1.0 and 0.5 mils are presented in Table 5 and demonstrate that the properties stayed high at lower gauges.

TABLE 5

| Sample | Film Gauge (mil) | Dart Impact (g) | MD Tear (g) | TD Tear (g) |
|---|---|---|---|---|
| COMP-1 | 1.0 | 112 | 31 | 751 |
| INV-I-1 | 1.0 | 200 | 86 | 589 |
| INV-I-2 | 0.5 | 183 | 19 | 387 |
| INV-J-1 | 1.0 | 314 | 82 | 532 |
| INV-J-2 | 0.5 | 258 | 21 | 342 |
| INV-H-1 | 1.0 | 261 | 88 | 553 |
| INV-H-2 | 0.5 | 238 | 21 | 313 |
| INV-K-1 | 1.0 | 219 | 79 | 763 |
| INV-K-2 | 0.5 | 279 | 21 | 399 |

The results indicate that films formed from PE polymers of the type disclosed herein exhibit high toughness as evidenced by the tear and impact properties even at a film gauge of 0.5 mil. In contrast the conventional MDPE resin, Sample COMP-1, could not be converted into a 0.5 mil film due to poor bubble stability. PE polymers of the type disclosed herein can be advantageously downgauged while retaining their impact properties and tear strength.

Additional properties of the samples were investigated and the results are presented in Tables 6-8. Samples COMP-1a and COMP-1b were obtained from two differing batches of comparative sample COMP-1.

TABLE 6

| Sample | HLMI (dg/min) | MD Tear (g) | TD Tear (g) | Haze (%) | Gloss 60% | Zero Shear Viscosity (Pa-s) | tau (s) | CY-a | $M_n$ (kg/mol) | $M_w$ (kg/mol) | $M_z$ (kg/mol) | $M_w/M_n$ |
|---|---|---|---|---|---|---|---|---|---|---|---|---|
| INV-G | 9.5 | 88 | 553 | 80 | 10 | 7.4E+04 | 0.5306 | 0.5419 | 12.1 | 201.3 | 701.9 | 16.7 |
| INV-H | 15.0 | 86 | 589 | 84 | 9 | 6.7E+04 | 0.5356 | 0.5296 | 10.6 | 192.2 | 724.6 | 18.2 |
| INV-I | 10.1 | 82 | 532 | 79 | 10 | 7.3E+04 | 0.5137 | 0.5425 | 11.9 | 200.3 | 687.1 | 16.8 |
| INV-J | 9.5 | 79 | 763 | 77 | 11 | 8.7E+04 | 0.5619 | 0.5155 | 11.7 | 208.1 | 737.5 | 17.8 |
| INV-K | 5.4 | 47 | 768 | 90 | n/a | 1.4E+05 | 0.9874 | 0.5262 | 31.2 | 242.8 | 715 | 7.8 |
| INV-L | 9.2 | 54 | 799 | 92 | n/a | 1.0E+05 | 0.8400 | 0.4611 | 31.6 | 217.1 | 675 | 6.9 |
| INV-M | 8.6 | 33 | 801 | 92 | n/a | 1.1E+05 | 0.8674 | 0.4705 | 26.9 | 224.2 | 727 | 8.3 |
| INV-N | 5.8 | 46 | 648 | 90 | n/a | 1.4E+05 | 0.9975 | 0.5034 | 25.6 | 230.2 | 735 | 9.0 |
| COMP-1a | 23.1 | 62 | 543 | 53 | n/a | 3.6E+05 | 0.9317 | 0.1778 | 12.1 | 186.5 | 1220 | 15.4 |
| COMP-1b | 24.1 | 56 | 700 | 59 | 15 | 3.1E+05 | 0.822 | 0.1836 | 13.1 | 195.0 | 1649.4 | 14.9 |

TABLE 7

| Sample | MD Yield Strain (%) | MD Yield Strength (psi) | MD Tensile Break Strain (%) | MD Tensile Break Strength (psi) | MD Modulus (psi) | MD 1% Secant Modulus (psi) | MD 2% Secant Modulus (psi) |
|---|---|---|---|---|---|---|---|
| INV-K | 5.4 | 3,124 | 254 | 11,542 | 106,400 | 96,356 | 78,726 |
| INV-L | 4.6 | 3,000 | 333 | 10,347 | 106,319 | 95,379 | 77,297 |
| INV-M | 4.6 | 3,034 | 287 | 10,002 | 105,969 | 98,246 | 79,817 |
| INV-N | 5.0 | 3,172 | 256 | 12,020 | 108,376 | 99,268 | 81,479 |
| COMP-1 | 68.4 | 3,626 | 493 | 8,037 | 91,603 | 82,650 | 66,165 |

TABLE 8

| Sample | TD Yield Strain (%) | TD Yield Strength (psi) | TD Yield Strength (MPa) | TD Tensile Break Strain (%) | TD Tensile Break Strength (psi) | TD Modulus (psi) | TD Modulus (MPa) | TD 1% Secant Modulus (psi) | TD 1% Secant Modulus (MPa) | TD 2% Secant Modulus (psi) |
|---|---|---|---|---|---|---|---|---|---|---|
| INV-K | 3.9 | 3,718 | 25.6 | 505 | 6,878 | 169,562 | 1,169 | 146,910 | 1,013 | 112,320 |
| INV-L | 4.0 | 3,832 | 26.4 | 603 | 7,249 | 166,246 | 1,146 | 145,237 | 1,001 | 112,082 |
| INV-M | 3.9 | 3,864 | 26.6 | 570 | 6,721 | 170,351 | 1,175 | 148,320 | 1,023 | 113,967 |
| INV-N | 3.6 | 3,805 | 26.2 | 545 | 7,647 | 168,613 | 1,163 | 146,068 | 1,007 | 111,707 |
| COMP-1 | 7.2 | 3,261 | 22.5 | 622 | 6,531 | 108,688 | 749 | 93,338 | 644 | 71,292 |

ADDITIONAL DISCLOSURE

The following enumerated embodiments are provided as non-limiting examples.

A first embodiment which is an ethylene alpha-olefin copolymer having (a) a density of from about 0.910 g/cc to about 0.940 g/cc; (b) a weight average molecular weight of from about 150,000 g/mol to about 300,000 g/mol; and (c) a melt index at a load of 2.16 kg of from about 0.01 dg/10 min. to about 0.5 dg/min.; wherein a 1 mil blown film formed from the polymer composition is characterized by (i) a Dart Impact strength greater than about 175 g/mil; (ii) an Elmendorf machine direction tear strength greater than about 20 g/mil; and (iii) an Elmendorf transverse direction tear strength greater than about 475 g/mil.

A second embodiment which is the copolymer of the first embodiment having a higher molecular weight component and a lower molecular weight component.

A third embodiment which is the copolymer of the second embodiment wherein the lower molecular weight component has a weight average molecular weight of from about 5,000 g/mol to about 100,000 g/mol.

A fourth embodiment which is the copolymer of any one of the second through third embodiments wherein the higher molecular weight component has a weight average molecular weight of from about 300,000 g/mol to about 600,000 g/mol.

A fifth embodiment which is the copolymer of any one of the first through fourth embodiments having a number average molecular weight of from about 8,000 g/mol to about 35,000 g/mol.

A sixth embodiment which is the copolymer of any one of the first through fifth embodiments having a molecular weight distribution of from about 4 to about 30.

A seventh embodiment which is the copolymer of any one of the first through sixth embodiments having a Eta(0) value of from about $1 \times 10^4$ Pa·s to about $5 \times 10^5$ Pa·s.

An eighth embodiment which is the copolymer of any one of the first through seventh embodiments having a tau-eta value of from about 0.2 s to about 5 s.

A ninth embodiment which is the copolymer of any one of the first through eighth embodiments having a CY-a value of from about 0.35 to about 0.65.

A tenth embodiment which is the copolymer of any one of the first through ninth embodiments having a melt index at a load of 5.0 kg of from about 0.01 dg/min. to about 1 dg/min.

An eleventh embodiment which is the copolymer of any one of the first through tenth embodiments having a melt index at a load of 10.0 kg of from about 0.01 dg/min. to about 5 dg/min.

A twelfth embodiment which is the copolymer of any one of the first through eleventh embodiments having a high-load melt index at a load of 21.6 kg of from about 4 dg/min to about 25 dg/min.

A thirteenth embodiment which is the copolymer of any one of the first through twelfth embodiments having a yield strain in the machine direction of less than about 8%.

A fourteenth embodiment which is the copolymer of any one of the first through thirteenth embodiments having a sum of the yield strain in the machine direction and yield strain in the transverse direction of less than about 15%.

A fifteenth embodiment which is the copolymer of any one of the first through fourteenth embodiments wherein the copolymer comprises 1-butene, 1-pentene, 1-hexene, 3-methyl-1-butene, 4-methyl-1-pentene, 1-heptene, 1-octene, 1-nonene, 1-decene or combinations thereof.

A sixteenth embodiment which is a film formed from the copolymer of any one of the first through fifteenth embodiments having a Spencer impact of from about 0.25 J to about 2.5 J.

A seventeenth embodiment which is the film of the sixteenth embodiment having a haze value of greater than about 70%.

An eighteenth embodiment which is the film of the sixteenth embodiment having a haze value of greater than about 80%.

A nineteenth embodiment which is an ethylene alpha-olefin copolymer having (a) a density of from about 0.910 g/cc to about 0.940; (b) a weight average molecular weight of from about 150,000 g/mol to about 300,000 g/mol; and (c) a melt index at a load of 2.16 kg of from about 0.01 dg/10 min. to about 0.5 dg/min.; wherein a 1 mil blown film formed from the copolymer has (i) a Dart Impact strength greater than about 200 g/mil, (ii) an Elmendorf machine direction tear strength less than about 100 g/mil and (iii) an Elmendorf transverse direction tear strength greater than about 550 g/mil.

A twentieth embodiment which is an ethylene alpha-olefin copolymer having a density of from about 0.910 g/cc to about 0.940 g/cc; a weight average molecular weight of from about 150,000 g/mol to about 300,000 g/mol; a melt index at a load of 2.16 kg of from about 0.01 dg/min. to about 0.5 dg/min.; a melt index at a load of 5.0 kg of from about 0.01 dg/min. to about 1 dg/min.; a melt index at a load of 10.0 kg of from about 0.01 dg/min. to about 5 dg/min; and a high-load melt index at a load of 21.6 kg of from about 4 dg/min to 25 dg/min, wherein a 1-mil blown film formed from the polymer composition has an Elmendorf tear strength in the machine direction of from about 10 g to about 130 g as determined in accordance with ASTM D1922.

A twenty-first embodiment which is the copolymer of the twentieth embodiment, wherein the blown film has a dart drop impact strength, measured in accordance with ASTM D1709 Method A, of from about 100 g to about 900 g.

Without further elaboration, it is believed that one skilled in the art can, using the description herein, utilize the present invention to its fullest extent. While inventive aspects have been shown and described, modifications thereof can be made by one skilled in the art without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The disclosures of all patents, patent applications, and publications cited herein are hereby incorporated by reference, to the extent that they provide exemplary, procedural or other details supplementary to those set forth herein.

What is claimed is:

1. An ethylene alpha-olefin copolymer having:
   (a) a density of from about 0.910 g/cc to about 0.940 g/cc;
   (b) a melt index (MI) ranging from about 0.01 dg/min. to about 0.5 dg/min.; a high load melt index (HLMI) ranging from about 4 dg/min. to about 25 dg/min.; and a ratio of the high load melt index (HLMI) to the melt index (MI) of from about 100 to about 2500, wherein the high load melt index (HLMI) is determined in accordance with ASTM D1238 at a load of 21.6 kg at 190° C., and the melt index (MI) is determined in accordance with ASTM D1238 at a load of 2.16 kg at 190° C.;
   (c) a CY-a value of from about 0.35 to about 0.65;
   (d) a moisture vapor transmission rate of less than about 1.3 g-mil/100 in$^2$-day when tested in accordance with ASTM F1249 at 100° F. and 90% relative humidity using a test specimen having a 1 mil thickness; and
   (e) a molecular weight distribution of from about 6 to about 30.

2. The copolymer of claim 1 having a 1% secant modulus in the machine direction of from about 90,000 psi to about 116,000 psi when tested in accordance with ASTM D882.

3. The copolymer of claim 1 having a 2% secant modulus in the machine direction of from 77,297 to 81,479 psi when tested in accordance with ASTM D882.

4. The copolymer of claim 1 having a 1% secant modulus in the transverse direction of from about 110,000 psi to about 174,000 psi when tested in accordance with ASTM D882.

5. The copolymer of claim 1 having a 2% secant modulus in the transverse direction of from 111,707 to 113,967 psi when tested in accordance with ASTM D882.

6. The copolymer of claim 1 having a yield strain in the machine direction of less than about 8% when tested in accordance with ASTM D882.

7. The copolymer of claim 1 having a yield strain in the transverse direction of from about 2% to about 5% when tested in accordance with ASTM D882.

8. The copolymer of claim 1 having a break strength in the transverse direction of from about 4300 psi to about 10,000 psi when tested in accordance with ASTM D882.

9. The copolymer of claim 1 having a break strength in the machine direction of from about 6500 psi to about 13,500 psi when tested in accordance with ASTM D882.

10. An ethylene alpha-olefin copolymer having:
    (a) a density of from about 0.910 g/cc to about 0.940 g/cc;
    (b) a melt index (MI) ranging from about 0.01 dg/min. to about 0.5 dg/min.; a high load melt index (HLMI) ranging from about 4 dg/min. to about 25 dg/min.; and a ratio of the high load melt index (HLMI) to the melt index (MI) of from about 100 to about 2500, wherein the high load melt index (HLMI) is determined in accordance with ASTM D1238 at a load of 21.6 kg at 190° C., and the melt index (MI) is determined in accordance with ASTM D1238 at a load of 2.16 kg at 190° C.;
    (c) a CY-a value of from about 0.35 to about 0.65;
    (d) a moisture vapor transmission rate of less than about 1.3 g-mil/100 in$^2$-day when tested in accordance with ASTM F1249 at 100° F. and 90% relative humidity using a test specimen having a 1 mil thickness; and
    (e) a weight average molecular weight of from about 150,000 g/mol to about 300,000 g/mol.

11. The copolymer of claim 10 having a 1% secant modulus in the machine direction of from about 90,000 psi to about 116,000 psi when tested in accordance with ASTM D882.

12. The copolymer of claim 10 having a 2% secant modulus in the machine direction of from 77,297 to 81,479 psi when tested in accordance with ASTM D882.

13. The copolymer of claim 10 having a 1% secant modulus in the transverse direction of from about 110,000 psi to about 174,000 psi when tested in accordance with ASTM D882.

14. The copolymer of claim 10 having a 2% secant modulus in the transverse direction of from 111,707 to 113,967 psi when tested in accordance with ASTM D882.

15. The copolymer of claim 10 having a yield strain in the machine direction of less than about 8% when tested in accordance with ASTM D882.

16. The copolymer of claim 10 having a yield strain in the transverse direction of from about 2% to about 5% when tested in accordance with ASTM D882.

17. The copolymer of claim 10 having a break strength in the transverse direction of from about 4300 psi to about 10,000 psi when tested in accordance with ASTM D882.

18. The copolymer of claim 10 having a break strength in the machine direction of from about 6500 psi to about 13,500 psi when tested in accordance with ASTM D882.

* * * * *